(12) United States Patent
Köhler

(10) Patent No.: US 11,052,779 B2
(45) Date of Patent: Jul. 6, 2021

(54) CHARGING STATION

(71) Applicant: Dr. Ing. h.c. F. Porsche Aktiengesellschaft, Stuttgart (DE)

(72) Inventor: David Köhler, Bietigheim-Bissingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 174 days.

(21) Appl. No.: 16/505,879

(22) Filed: Jul. 9, 2019

(65) Prior Publication Data

US 2020/0016992 A1   Jan. 16, 2020

(30) Foreign Application Priority Data

Jul. 13, 2018 (DE) .......................... 102018117058.0

(51) Int. Cl.

| | |
|---|---|
| *B60L 53/31* | (2019.01) |
| *B60L 53/60* | (2019.01) |
| *B60L 53/30* | (2019.01) |
| *B60L 53/16* | (2019.01) |
| *H02J 7/00* | (2006.01) |
| *G07G 1/00* | (2006.01) |
| *B60L 53/18* | (2019.01) |

(52) U.S. Cl.
CPC ............... *B60L 53/31* (2019.02); *B60L 53/16* (2019.02); *B60L 53/18* (2019.02); *B60L 53/305* (2019.02); *B60L 53/60* (2019.02); *G07G 1/0045* (2013.01); *H02J 7/0027* (2013.01); *B60L 2250/16* (2013.01); *H01R 2201/26* (2013.01)

(58) Field of Classification Search
CPC .............................. B60L 53/31; H02J 7/0027
USPC .......................................................... 320/109
See application file for complete search history.

(56) References Cited

U.S. PATENT DOCUMENTS

| | | | | |
|---|---|---|---|---|
| 5,306,999 A | * | 4/1994 | Hoffman | B60L 53/31 320/109 |
| 5,461,299 A | * | 10/1995 | Bruni | B60L 53/12 320/108 |
| 2010/0315040 A1 | * | 12/2010 | Sakurai | B60L 53/20 320/109 |
| 2011/0074351 A1 | * | 3/2011 | Bianco | G07F 15/005 320/109 |

(Continued)

FOREIGN PATENT DOCUMENTS

EP       2476577 A2    7/2012

*Primary Examiner* — Suchin Parihar
(74) *Attorney, Agent, or Firm* — RatnerPrestia

(57) ABSTRACT

A charging station having a static charging column, an operator control panel mounted in the charging column, a charging cable mounted in the charging column, and a plug receptacle mounted in the charging column for a charging plug connected to the charging cable. The charging column has an upper receptacle and a lower receptacle on a front side. In a first configuration for use by a standing person the charging column is configured such that the operator control panel is received by the upper receptacle and the plug receptacle is received by the lower receptacle. In a second configuration for use by a person seated in a wheelchair the charging column is configured such that an appliance carrier which projects beyond the front side is received by the lower receptacle, wherein the appliance carrier receives the operator control panel and the plug receptacle.

19 Claims, 3 Drawing Sheets

(56) References Cited

U.S. PATENT DOCUMENTS

| | | | | |
|---|---|---|---|---|
| 2012/0048983 | A1* | 3/2012 | Bianco | B60L 11/1818 242/388.9 |
| 2013/0076902 | A1* | 3/2013 | Gao | B60L 53/35 348/148 |
| 2020/0324661 | A1* | 10/2020 | Freeling-Wilkinson | B60L 53/22 |
| 2021/0053456 | A1* | 2/2021 | Freeling-Wilkinson | B60L 53/18 |

* cited by examiner

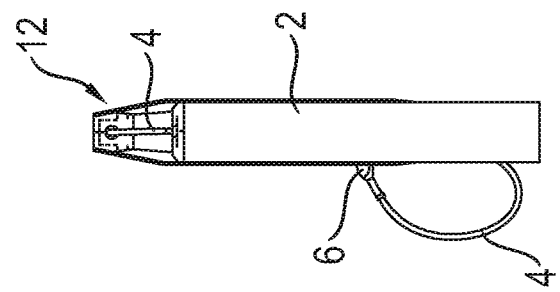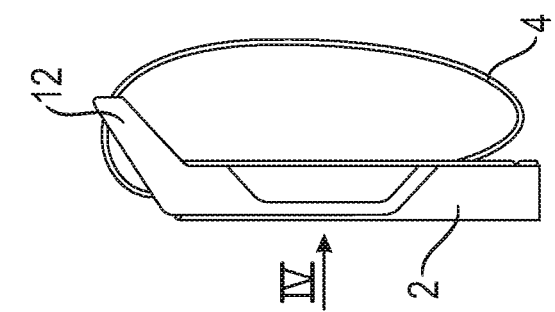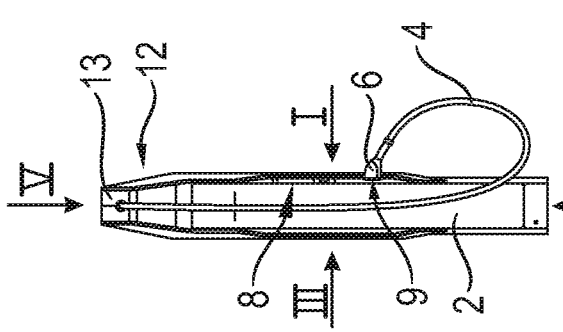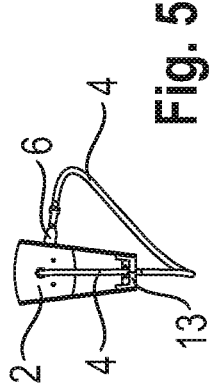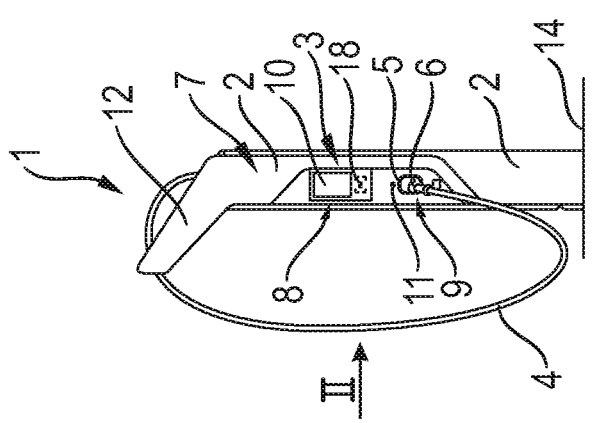

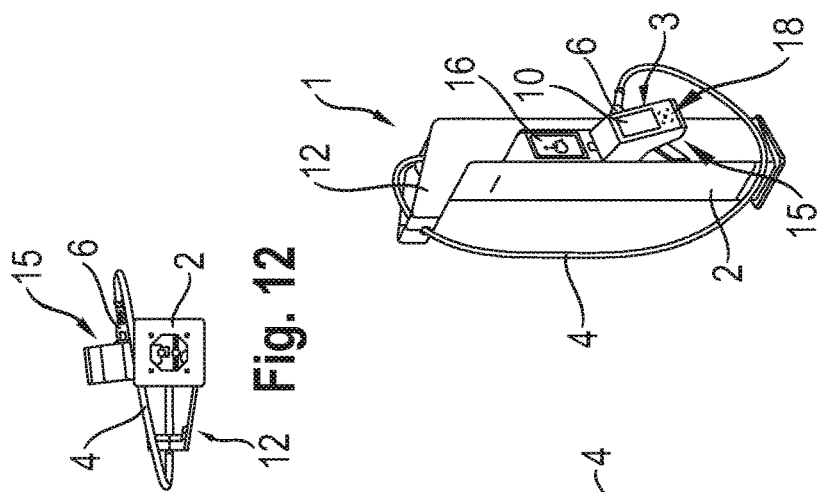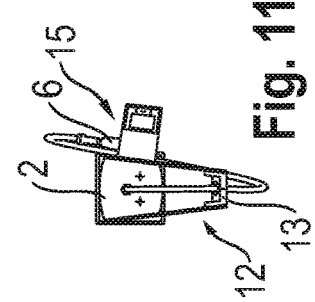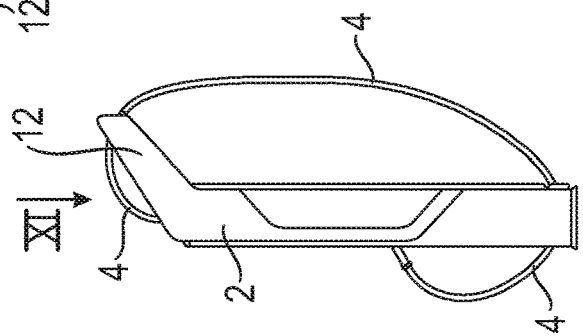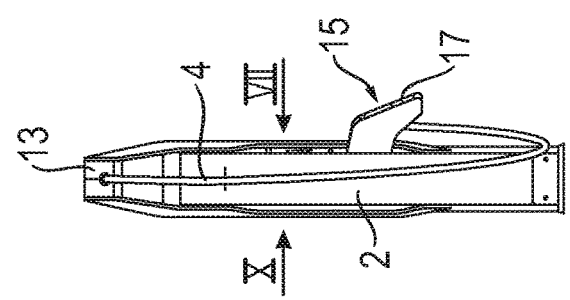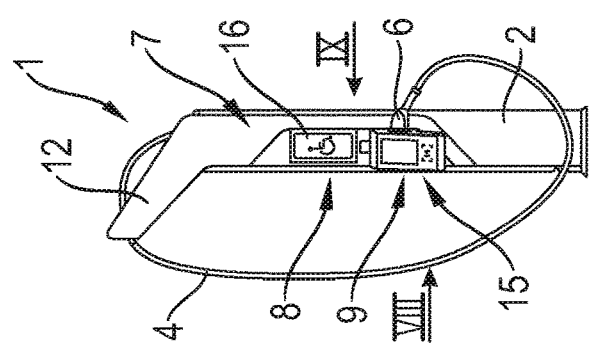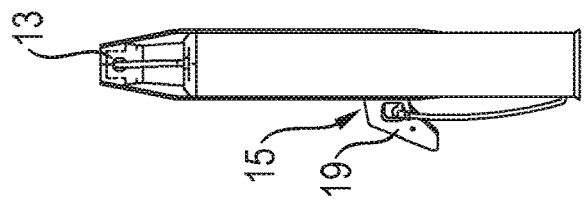

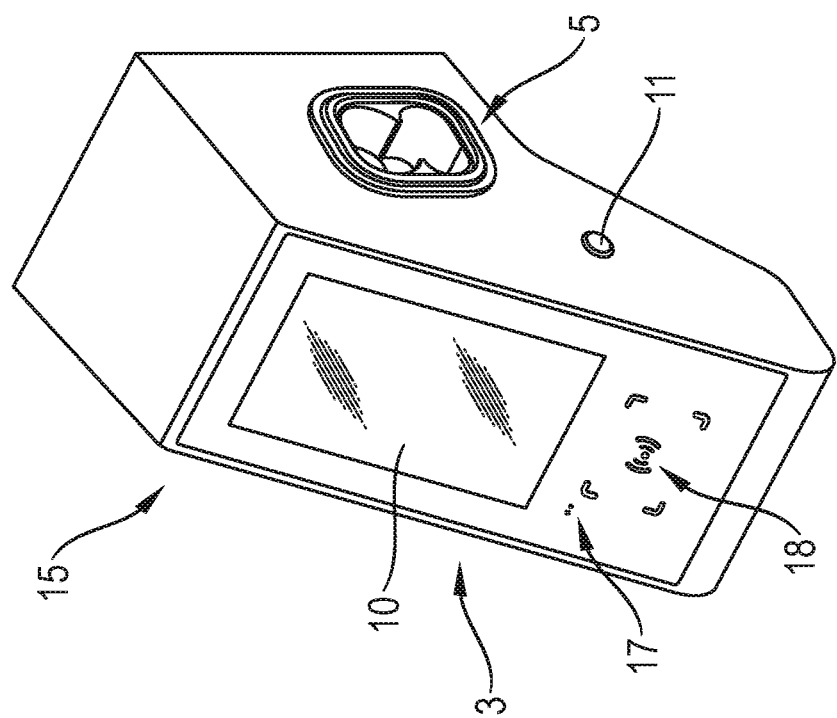

US 11,052,779 B2

CHARGING STATION

CROSS-REFERENCE TO RELATED APPLICATION

This application claims priority to German Patent Application No. 10 2018 117 058.0, filed Jul. 13, 2018, the content of such application being incorporated by reference herein in its entirety.

FIELD OF THE INVENTION

The invention relates to a charging station having a static charging column, having an operator control panel, mounted in the charging column, for the charging station, having a charging cable mounted in the charging column, and having a plug receptacle, mounted in the charging column, for a charging plug connected to the charging cable.

BACKGROUND OF THE INVENTION

Such charging stations serve in particular for the charging of at least partially electrically operable motor vehicles, in particular passenger motor vehicles. Charging stations of a wide variety of designs are used, wherein charging stations can basically be divided into two categories, specifically charging stations which, with regard to their height, that is to say vertical extent, are adapted for use by persons in a standard height range for a person, and charging stations which are adapted for use by persons seated in wheelchairs.

A charging station of the type mentioned at the outset is known from EP 2 476 577 A2, which is incorporated by reference herein. In the case of said charging station, the static charging column has two lower, vertically arranged posts which are mounted in the static ground and which form a free space between them. At the top, the posts receive a cabinet-like region of the charging column, which in a lower region has the operator control panel and the plug receptacle. Owing to this design, the charging station constitutes a compromise with regard to use by a person of a height in a standard height range for a person and a person seated in a wheelchair. The person of the height in the standard height range for a person can, owing to the ergonomically expedient arrangement of the plug receptacle for that person, grip the charging cable in an expedient manner in the region of the charging plug and connect it to the vehicle for the purposes of charging the battery thereof. The extremely low, ergonomically unfavorable arrangement of the operator control panel for that person is a disadvantage. An operator control panel normally comprises a display module, preferably a display module which is also realized as a touchscreen. Such a display module cannot be optimally viewed by the person, inter alia from a glare aspect. This charging station is advantageous for a person seated in a wheelchair from the aspect of the arrangement of the operator control panel and the arrangement of the plug receptacle, firstly owing to the ergonomically expedient arrangement of operator control panel and charging plug in terms of height for that person, and also from the aspect that a projecting appliance carrier, which forms a constituent part of the charging column, receives the operator control panel and the plug receptacle. However, the lower posts, arranged spaced apart from one another, of the charging column constitute a compromise for the person seated in the wheelchair, because said person must move exactly into the intermediate space between the two posts in order to be able to move close enough to the projecting carrier to operate the charging station.

SUMMARY OF THE INVENTION

A universally usable charging station which, with only slight modification, can be utilized in an ergonomically optimal manner for a standing person of a height in a standard height range for a person and for a person seated in a wheelchair.

Described herein is a charging station which can be modified in uncomplicated fashion with respect to second variants. In one modification, the charging station is configured optimally for a person of a height in a standard height range for a person. In the other modification, the charging station is configured optimally for use by a person seated in a wheelchair. Only few alterations or conversions need to be made to the charging station in order to modify the charging station. It is thus possible during the production of the charging station, or even during the installation of the charging stations on site, to decide whether the charging station is to be constructed in the modification for use by a standing person of a height in a standard height range for a person, or in the modification for use by a person seated in a wheelchair. Even at a later point in time, when the charging station has already been installed on site, it is possible, in particular if the user emphasis in a charging park with multiple charging stations changes, for said charging station to be easily converted from use by a standing person of a height in a standard height range for a person to use by a person seated in a wheelchair, and vice versa.

The charging column according to aspects of the invention has an upper receptacle and a lower receptacle on a front side. In a first embodiment for use by a standing person of a height in a standard height range for a person, the charging column is configured such that the operator control panel is received by the upper receptacle and the plug receptacle is received by the lower receptacle. In a second embodiment for use by a person seated in a wheelchair, the charging column is configured such that an appliance carrier which projects beyond the front side is received by the lower receptacle, wherein the appliance carrier receives the operator control panel and the plug receptacle.

In the first embodiment, it is thus the case that both the operator control panel and the plug receptacle are arranged in an ergonomically expedient manner for the standing person, with an optimally slim form of the charging column, which therefore has no projecting appliance carrier. The charging station can thus be operated in an ergonomically expedient manner by the standing person. By contrast, in the second embodiment, the charging station is configured in an ergonomically expedient manner for a person seated in a wheelchair, because the projecting appliance carrier, which receives both the operator control panel and the plug receptacle, is positioned at the level of the lower receptacle. The projecting appliance carrier makes it possible for the person seated in the wheelchair to move under the appliance carrier, such that both the operator control panel and the plug receptacle are accessible in an ergonomically particularly expedient manner for that person.

Irrespective of the respectively realized embodiment of the charging column for disabled persons, the operator control panel preferably has a display module and/or an RFID reader and/or an off switch for manually ending the charging process. In particular, all of these elements are realized in the charging column, that is to say not merely alternatively. The display module is in particular a panel which is stable in terms of a viewing angle, and has in particular an IPS panel. The display module preferably has a touchscreen.

In the embodiment of the charging column for disabled persons, it is advantageous if the appliance carrier has all HMI (Human Machine Interface) elements, that is to say in particular a touchscreen, an RFID reader, an off switch or button for ending the charging process, a plug receptacle, that is to say a plug holder, preferably having a holder display, in particular LED holder display, such that it can be identified that the charging plug has been correctly inserted into the plug receptacle after the charging process.

In the case of the first embodiment, it is considered to be particularly advantageous if a side, facing toward the operator, of the operator control panel and/or of the display module is aligned with the front side, facing toward the operator, of the charging column. This yields ergonomically particularly expedient operator controllability, because these functional elements are arranged in a defined manner relative to the charging column, specifically in a defined manner relative to the front side of the charging column. From this aspect, it is furthermore considered to be advantageous if, in the first embodiment, on a side facing toward the operator, the plug receptacle is aligned with the front side, facing toward the operator, of the charging column.

In this first embodiment, from ergonomic aspects, provision is made in particular whereby, the operator control panel, in particular the display module, is arranged at a height of the charging column of 135 to 165 cm above the ground and/or the plug receptacle is arranged at a height of the charging column of 100 to 110 cm above the ground.

In the second embodiment of the charging column, it is considered to be particularly advantageous from economic aspects if a front side, facing toward the operator, that is to say the person seated in the wheelchair, of the appliance carrier is arranged so as to be inclined with respect to a vertical, that is to say is closer to the operator in the lower region of said front side than in the upper region of said front side. The operator can thus review this front side in particular in an expedient manner. This front side is in particular formed by a non-domed plane. The appliance carrier, on the front side, preferably has the display module in an upper region and has the RFID reader in a lower region. The display module is thus arranged at an expedient height relative to the ground and can be easily viewed by the operator, whereas the RFID reader is arranged at a level below the display module.

Preferably, the appliance carrier, in the region of a side wall arranged between the front side of the appliance carrier and the charging column, receives the plug receptacle and/or the off switch. When a wheelchair is positioned such that the person seated on the wheelchair is viewing the front side of the appliance carrier, that person can, in an ergonomically expedient manner, remove the charging plug for charging the vehicle battery laterally from the plug receptacle positioned there in the appliance carrier, and can ergonomically reinsert the charging plug from the side into the plug receptacle after the charging process. The off switch is also accessible in an ergonomically expedient manner on that side of the appliance carrier.

In this second embodiment, provision is made in particular whereby the appliance carrier projects by 15 to 25 cm, in particular 20 cm, with respect to the front side of the charging column in the region of the appliance carrier. In this second embodiment, provision is in particular furthermore made whereby the appliance carrier is arranged at a height of the charging column of 80 to 110 cm, preferably of 85 to 105 cm, above the ground. The stated projection dimensions and height dimensions of the appliance carrier make it possible for the person seated on the wheelchair to move under the charging column in an ergonomically expedient manner.

Against the background of the design of the charging station according to aspects of the invention and of the charging column in accordance with its refinements, it is possible, for both embodiments, for a charging column to be used which, from the ground to above the upper receptacle, has a constant, in particular trapezoidal or square column cross section. It is considered to be advantageous if the charging column, at least below the lower receptacle, has this constant, in particular trapezoidal or square column cross section. It is considered to be advantageous here if a length of the respective side of trapezoid or square amounts to a square side of 30 to 40 cm. In the first embodiment, the charging station is thus constituted substantially by the slim charging column, whereas, in the second embodiment, the appliance carrier is additionally fastened to the charging column.

In the second embodiment, provision is made in particular whereby the upper receptacle is covered by means of a faceplate, for example covered by means of a faceplate connected to the upper receptacle. This upper receptacle is not required in the second embodiment because functional elements of the first embodiment are integrated into the projecting appliance carrier in the second embodiment.

In one advantageous refinement of the charging column provision is made whereby said charging column has an end which projects laterally at the top. Here, the charging cable is led out of the charging column in an upper region of the charging column, and the charging cable is led from there via the projecting end. This configuration ensures guidance of the charging cable from the charging column to the charging plug which ensures permanent advantageous positioning of the charging cable relative to the charging column. The length of the charging cable is preferably dimensioned such that, when the charging plug has been inserted into the plug receptacle, the charging cable does not make contact with the ground.

BRIEF DESCRIPTION OF THE DRAWING

Further features of the invention will emerge from the subclaims, from the appended drawing and from the description of a preferred exemplary embodiment depicted in the drawing, with which the two embodiments of the charging station can be realized, without being restricted to these.

In the drawing:

FIG. 1 shows a charging station in a first embodiment for use by a standing person of a height in a standard height range for a person, as per view I in FIG. 2, FIG. 2 shows the charging station in a view II in FIG. 1, FIG. 3 shows the charging station in a view III as per FIG. 2, FIG. 4 shows the charging station in a view IV as per FIG. 3, FIG. 5 shows the charging station in a view V as per FIG. 2, FIG. 6 shows the charging station in a view VI as per FIG. 2, FIG. 7 shows the charging station in the second embodiment, modified in relation to the first embodiment, for use by a person seated in a wheelchair, as per view VII in FIG. 8, FIG. 8 shows the charging station in a view VIII in FIG. 7, FIG. 9 shows the charging station in a view IX as per FIG. 7, FIG. 10 shows the charging station in a view X as per FIG. 8, FIG. 11 shows the charging station in a view XI as per FIG. 10, FIG. 12 shows the charging station in a view XII as per FIG. 10, FIG. 13 shows the charging station as per FIGS. 9 to 12 in a three-dimensional view, FIG. 14 shows the projecting appliance carrier, used in the charging station as per FIGS. 9 to 13, together with operator control panel and plug receptacle in a three-dimensional view.

DETAILED DESCRIPTION OF THE INVENTION

Firstly, with reference to the illustration of FIGS. 1 to 6, a charging station will be described which is designed in accordance with a first embodiment and which is provided for use by a standing person of a height in a standard height range for a person.

The charging station 1 has a static charging column 2, an operator control panel 3, mounted in the charging column 2, for the charging station 1, a charging cable 4 mounted in the charging column 2, and a plug receptacle 5, mounted in the charging column 2, for a charging plug 6 connected to the charging cable 4.

The charging column 2 has an upper receptacle 8 and a lower receptacle 9 on a front side 7. The operator control panel 3 is received by the upper receptacle 8 and the plug receptacle 5 is received by the lower receptacle. The operator control panel 3 arranged at the top has a display module 10, wherein said display module has a panel which is stable in terms of a viewing angle, in particular an IPS panel. This display module 10 has a touchscreen. Below the display module 10, the operator control panel 3 has an RFID reader 18. Slightly above the plug receptacle 5, below the operator control panel 3, there is arranged a mechanical off switch 11 or button for ending the charging process. The plug receptacle 5 may additionally be equipped with an LED display which illuminates when the charging plug 6 has been reinserted into the plug receptacle 5 after the charging process of the battery of a motor vehicle, in particular passenger motor vehicle.

The charging column 2 has an end 12 which projects laterally at the top and which extends parallel to the front side 7. The charging cable 4 is led out of the charging column 2 in an upper region of the charging column 2, where the angling of the end 12 occurs. From there, the charging cable 4 is led through a support element 13 mounted in the charging column 2, and is led in an open loop back to the region of the plug receptacle 5. There, the charging plug 6 is inserted into the plug receptacle 5. When the charging plug has been inserted, the charging cable 4 does not make contact with the ground 14, which is additionally illustrated in FIG. 1.

The charging station 1 is arranged in a charging park for motor vehicles such that the end 12 points toward the vehicle, that is to say the charging station is visible in a view as per FIG. 2 as seen from the vehicle.

In this first embodiment of the charging column, that side of the operator control panel 3, in particular of the display module 10, which faces toward the operator is aligned with the front side 7. Furthermore, that side of the plug receptacle 5 which faces toward the operator is aligned with the front side 7 facing toward the operator.

In this first embodiment, the operator control panel 3, in particular the display module 10, is arranged at a height of the charging column 2 of 135 to 165 cm above the ground 14 and the plug receptacle 5 is arranged at a height of the charging column 2 of 100 to 110 cm above the ground 14.

With regard to its region from the base 14 to the angled end 12, the charging column 2 has a constant trapezoidal cross section. The length of the respective side of the trapezoid amounts to 30 to 40 cm. The short side of the trapezoid is situated on the side of the projecting end 12. The charging column 2 thus constitutes an extremely slim, homogeneous column. Owing to this slim form, the charging column is easily accessible from all sides, in particular from the front side 7. In particular, the operator control panel 3, which is assigned to the upper receptacle 8, is situated at a relatively large height, such that it can be optimally operated by a person of a height in a standard height range for a person, and the display can also be optimally read, and inputs can be made by the person in an uncomplicated manner when using the touchscreen. The plug receptacle 5 assigned to the lower receptacle 9 is situated at a height which makes it possible for the charging plug 6 to be gripped in an ergonomically advantageous manner as the charging plug 6 is pulled out of the plug receptacle 5 or the charging plug 6 is inserted into the plug receptacle 5.

The charging station according to this first embodiment can be converted in a simple manner to form the charging column 2 in the second embodiment, in which said charging column is provided for use by a person seated in a wheelchair. In this respect, reference is made to FIGS. 7 to 13, which show this second embodiment of the charging station 1 or charging column 2.

In this second embodiment of the charging column 2, a projecting appliance carrier 15 is provided in the region of the lower receptacle 9, which appliance carrier is received by the lower receptacle 9. This appliance carrier 15 receives the operator control panel 3 and the plug receptacle 5. Since the region of the upper receptacle 8 of the charging column 2 is consequently not required by functional elements, the upper receptacle 8 is covered by means of a faceplate 16. Said faceplate 16 bears, in particular, a symbol which indicates that the charging station 1 is intended for use by persons seated in a wheelchair.

The appliance carrier 15 has a front side 17 which faces toward the operator and which is inclined with respect to a vertical, with a lower region of the front side 17 closer to the operator than an upper region of the front side 17. This front side 17 is formed by a non-domed plane. The appliance carrier 15, on the front side 17, has the operator control panel 7, specifically has the display module 10 with touchscreen in an upper region and has the RFID reader 18 in a lower region.

The appliance carrier 15 has the plug receptacle 5 and the off switch/button 11 in the region of a side wall 19 which is arranged between the front side 17 and the charging column 2. Here, the plug receptacle 5 is oriented such that the charging plug 6 can be inserted into the plug receptacle 5 in a direction as per arrow IX, that is to say laterally, and can be pulled out of the plug receptacle 5 in the opposite direction.

In this second embodiment, the appliance carrier 15 projects by 15 to 25 cm, in particular 20 cm, with respect to the front side 7 of the charging column 2 in the region of the appliance carrier 15. The appliance carrier 15 is arranged at a height of the charging column 2 of 80 to 110 cm, preferably of 85 to 105 cm, above the ground 14.

Using substantially identical elements, a charging station 1 can be produced with a charging column 2 according to the first or second embodiment. It is possible for charging stations 1 that have already been assembled to be converted from the first embodiment to the second embodiment and vice versa. During the conversion from the first embodiment to the second embodiment, a module assigned to the upper receptacle 8, which module substantially has the operator control panel 3, must be dismounted and disconnected, and the faceplate 16 must subsequently be attached in the region of the upper receptacle 8. Furthermore, a module assigned to the lower receptacle 9, which module has substantially the plug receptacle 5 and the button 11, must be dismounted, and a module which has the appliance carrier 15 must be connected and attached to the lower receptacle 9, wherein said module has at least the operator control panel 3, the plug receptacle 5 and the button 11. The conversion from the second embodiment to the first embodiment takes place in the reverse sequence. Since, in both embodiments, the plug receptacles 5 are arranged substantially at the same height above the ground 14, it is ensured that the charging cable 4 does not lie on the ground 14 when the charging plug 6 has been inserted into the plug receptacle 5.

LIST OF REFERENCE DESIGNATIONS

1 Charging station
2 Charging column
3 Operator control panel
4 Charging cable
5 Plug receptacle
6 Charging plug
7 Front side
8 Upper receptacle
9 Lower receptacle
10 Display module
11 Button
12 End
13 Support element
14 Ground
15 Projecting appliance carrier
16 Faceplate
17 Front side
18 RFID reader
19 Side wall

What is claimed is:

1. A charging station comprising:
   a static charging column having an operator control panel mounted in the static charging column,
   a charging cable mounted in the charging column,
   a plug receptacle mounted in the charging column for connectively receiving a charging plug connected to the charging cable when the charging cable is not in use, and
   an upper receptacle and a lower receptacle on a front side of the charging column,
   wherein in a first configuration of the charging station for use by a standing person of a height in a standard height range for a person, the charging station is configured such that the operator control panel is connected to the upper receptacle and the plug receptacle is connected to the lower receptacle,
   wherein in a second configuration of the charging station for use by a person seated in a wheelchair, the charging station is configured such that an appliance carrier which projects beyond the front side is connected to the lower receptacle, and the appliance carrier carries the operator control panel and the plug receptacle.

2. The charging station as claimed in claim 1, wherein the operator control panel has a display module and/or an RFID reader and/or an off switch for manually ending a charging process.

3. The charging station as claimed in claim 2, wherein the display module has an in-plane switching (IPS) panel which is stable in terms of a viewing angle.

4. The charging station as claimed in claim 2, wherein the display module has a touchscreen.

5. The charging station as claimed in claim 1, wherein the appliance carrier has all human-machine interface (HMI) elements of the charging station.

6. The charging station as claimed claim 2, wherein, in the first configuration, a side of the operator control panel and/or of the display module facing toward an operator is aligned with the front side of the charging column facing toward the operator.

7. The charging station as claimed in claim 1, wherein, in the first configuration, a side of the plug receptacle facing toward an operator is aligned with the front side of the charging column facing toward the operator.

8. The charging station as claimed in claim 2, wherein, in the first configuration, the display module is arranged at a height on the charging column of 135 to 165 cm above the ground and/or the plug receptacle is arranged at a height on the charging column of 100 to 110 cm above the ground.

9. The charging station as claimed in claim 2, wherein, in the second configuration, a front side of the appliance carrier facing toward the operator is arranged so as to be (i) angled with respect to a vertical plane, and (ii) positioned closer to the operator in a lower region of said front side of the appliance carrier than in an upper region of said front side of the appliance carrier.

10. The charging station as claimed in claim 9, wherein the front side of the appliance carrier is formed by a non-domed plane.

11. The charging station as claimed in claim 9, wherein the front side of the appliance carrier includes the display module in an upper region thereof and the RFID reader in a lower region thereof.

12. The charging station as claimed in claim 9, wherein the appliance carrier, in a region of a side wall arranged between the front side of the appliance carrier and the charging column, receives the plug receptacle and/or the off switch for the insertion of the charging plug in a direction parallel to the front side of the charging column.

13. The charging station as claimed in claim 1, wherein, in the second configuration, the appliance carrier projects by 15 to 25 cm with respect to the front side of the charging column in a region of the appliance carrier.

14. The charging station as claimed in claim 1, wherein, in the second configuration, the appliance carrier is arranged at a height on the charging column of 80 to 110 cm above the ground.

15. The charging station as claimed in claim 1, wherein at an elevation below the lower receptacle, the charging column has a constant cross section and a length of 30 cm to 40 cm.

16. The charging station as claimed in claim 1, wherein, in the second configuration, the upper receptacle is covered by a faceplate that is connected to the upper receptacle.

17. The charging station as claimed in claim 1 further comprising an upper, laterally projecting end at an upper end of the charging column, wherein the charging cable is led out of the charging column via the projecting end.

18. The charging station as claimed in claim 17, wherein the length of the charging cable is dimensioned such that, when the charging plug has been inserted into the plug receptacle, the charging cable does not make contact with the ground.

19. The charging station as claimed in claim 1, wherein the plug receptacle is configured to be directly connected to the charging plug of the charging cable when the charging cable is not in use.

\* \* \* \* \*